United States Patent [19]

Jakinovich, Jr.

[11] 4,220,667
[45] Sep. 2, 1980

[54] ZINC CONTAINING CONDIMENTS

[75] Inventor: William Jakinovich, Jr., Cincinnati, Ohio

[73] Assignee: The Procter & Gamble Company, Cincinnati, Ohio

[21] Appl. No.: 931,073

[22] Filed: Aug. 4, 1978

Related U.S. Application Data

[63] Continuation of Ser. No. 750,926, Dec. 15, 1976, abandoned.

[51] Int. Cl.² .................... A23L 1/237; A23L 1/226
[52] U.S. Cl. ................................. 426/96; 426/97; 426/103; 426/289; 426/649; 426/658
[58] Field of Search ............... 426/96, 97, 103, 289, 426/295, 331, 649, 650, 658, 443, 74

[56] References Cited

U.S. PATENT DOCUMENTS

| | | | |
|---|---|---|---|
| 2,489,758 | 11/1949 | Dunn et al. | 426/649 |
| 2,550,726 | 5/1951 | Searle | 426/96 X |
| 2,606,839 | 8/1952 | Evans | 426/648 |
| 2,744,823 | 5/1956 | Diamond | 426/649 X |
| 2,764,485 | 9/1956 | Bash et al. | 426/96 X |
| 2,999,752 | 9/1961 | Webb | 426/74 |
| 3,514,296 | 5/1970 | Frank et al. | 426/649 |

FOREIGN PATENT DOCUMENTS 747247 9/1970 Belgium.

OTHER PUBLICATIONS

Eckstein et al., Chem. Abs., vol. 64, 16726b, 1966.

Primary Examiner—Esther M. Kepplinger
Attorney, Agent, or Firm—Jerry J. Yetter; Julius P. Filcik; Richard C. Witte

[57] ABSTRACT

Condiments, especially sodium chloride, are coated with saliva-insoluble zinc salts to prevent caking and to provide a dietary zinc supplement suitable for human use.

32 Claims, No Drawings

ZINC CONTAINING CONDIMENTS

This is a continuation, of application Ser. No. 750,926, filed Dec. 15, 1976 now abandoned.

BACKGROUND OF THE INVENTION

The importance of zinc in animal and human nutrition is receiving increased attention. Zinc has been shown to play an important role in taste acuity, enzyme reactions, and other physiological responses such as wound healing. Many modern diets do not provide optimal amounts of zinc to mammals. Supplementation of animal and human diets with zinc is, therefore, very important.

One supplemental dietary source of zinc is "sea salt," which is obtained by evaporating natural salt water. However, sea salt is very hygroscopic and inconvenient to handle. Like table salt (sodium chloride), sugar and other granulated or powdered condiments, sea salt tends to "cake" or form large clumps on storage under ambient conditions. In order to keep these condiments free flowing and easy to dispense under humid conditions, anti-caking agents such as magnesium silicate or calcium silicate are used. However, such agents add little, if anything, of nutritive value to the condiments and certainly do not provide a dietary source of zinc.

It is an object of this invention to provide a palatable condiment which will not cake and which also provides the daily requirement of zinc.

RELATED PATENT ART

U.S. Pat. No. 2,489,758, issued to Dunn, et al. (1949), describes a mineral salt block which is used to supplement a normal animal diet with trace minerals. Various bioavailable zinc salts, including zinc oxide and zinc carbonate are used to supply the zinc requirement. The salt blocks of the '758 patent are prepared by mixing the mineral supplements with ordinary salt, which is then compressed under pressure into a dense, solid mass.

U.S. Pat. No. 2,999,752, issued to Webb (1961), relates to a method of supplying zinc oxide as an additive to animal feed and fertilizer mixes. Zinc oxide is described as the preferred material since it is readily available to body tissues through the digestive processes. In order to minimize the difficulty in mixing zinc oxide with the minerals and animal feed, the zinc oxide is mixed with dolomitic lime to form it into discrete particles which are easier to handle in preparing animal feed mixes.

U.S. Pat. No. 2,606,839, issued to Evans (1952), describes a process for making a non-caking sea salt by first alkalizing and carbonating sea water to convert the magnesium and calcium salts to the corresponding carbonates before evaporating the sea water to dryness. The modified sea salt is said to be non-hygroscopic and to remain free-flowing for long periods.

Belgian Pat. No. 747,247, issued to Deutsche Solvay-Werke (1970), describes a method of reducing the agglomeration of sodium chloride or mixtures containing it by adding an additive of an alkali metal ferrocyanide and a zinc compound. The sodium chloride is preferably sprinkled with a suspension of the zinc ferrocyanide complex before milling or mixing.

None of the above references appears to have appreciated that the process of coating the mineral salt or feed particles with a zinc salt in the form of a finely divided powder would provide a zinc supplemented condiment and also reduce the tendency of condiments to cake. The "zinc coated" material provided herein is easy to handle and readily mixes with other foods or mineral salts to serve as a food supplement.

SUMMARY OF THE INVENTION

The present invention encompasses non-caking, palatable and nutritional compositions, comprising a granular condiment, especially table salt, the individual particles of said condiment being substantially coated with a safe and effective amount of a saliva-insoluble, physiologically acceptable zinc salt in the form of a finely divided powder. A process for preparing said nutritional composition by mixing the finely divided zinc salt with the granular condiment particles is also disclosed.

DETAILED DESCRIPTION OF THE INVENTION

This invention relates to non-caking and palatable condiment compositions which supply a nutritional amount of zinc.

By "condiment" is meant a material used to enhance the flavor of food, e.g., table salt, sea salt, sugar, seasoned salt, and the like.

By "non-caking" is meant that the condiment remains in a free flowing particulate form, even under humid conditions.

By "palatable" is meant that the composition is agreeable or pleasant to the sense of taste. In particular, zinc salts used herein are selected from non-astringent materials which do not substantially alter the taste of the condiment being coated.

By "nutritional" is meant that the composition supplies zinc in a bioavailable form. The condiment thus serves as a zinc supplement to the animal or human diet.

By "physiologically acceptable" is meant that the zinc salts used in the compositions are suitable for ingestion by humans or animals without any untoward physiological response, commensurate with a reasonable benefit/risk ratio.

By "safe and effective amount" is meant an amount of the zinc salt which both prevents caking of the condiment and alleviates dietary deficiencies of zinc (or supplements dietary levels), and yet causes no undesirable side effects (at a reasonable benefit/risk ratio). An amount sufficient to supply about 50 mg of zinc per day is typically used. The amount of zinc supplied will depend upon the zinc salt which is used and the amount of condiment which is ingested.

By "substantially coated" is meant that the outer surfaces of the individual particles of the condiment are, for the most part, covered with the zinc salt.

By "saliva-insoluble" is meant that the zinc salt is essentially insoluble, i.e., less than ca. 5% dissolved, in the secretions of the salivary glands. However, the zinc salts used herein are soluble in the acidic digestive juices; thus, they become nutritionally available in the stomach or intestines.

By "comprising" is meant that various other compatible ingredients may be present in the compositions in such proportions as will not adversely affect the non-caking and nutritional properties or the palatability of the compositions. The term "comprising" thus encompasses and includes the more restrictive terms "consisting of" and "consisting essentially of" within its scope.

All percentages and ratios herein are by weight, unless otherwise specified herein.

Certain condiments, especially sea salt, table salt and sugar are typically used in the form of granular particles, which are hygroscopic. In order to keep the particles from clumping or forming large masses, an anti-caking agent, for example, magnesium or calcium silicate, is added to the condiments. Simple zinc salts have not heretofore been used as anti-caking agents.

Many salts of zinc are nutritionally available, but due to other undesirable properties, they are not useful as anti-caking agents. Zinc sulfate, for example, is an emetic. Other zinc salts have an astringent effect in the mouth and therefore are unpalatable. In addition, many zinc salts such as zinc sulfate, and the like, are quite hygroscopic and are totally unsuitable for use with free flowing granular condiments such as table salt.

Zinc salts which are saliva-insoluble, non-hygroscopic and physiologically acceptable are used in the present compositions. Typical zinc salts with these properties include zinc oxide, zinc carbonate and zinc phosphate. These zinc salts are non-emetic, non-hygroscopic and, because they are insoluble in saliva, are non-astringent and do not have a bitter taste. These salts can be used alone or in combination in the practice of this invention. Indeed, zinc oxide reacts with carbon dioxide in the air, and therefore may contain some zinc carbonate.

The zinc salts which are used in the invention are chosen from the food and drug grade items of commerce. The amount of contamination by heavy metals such as arsenic, lead and cadmium should be within the acceptable range of safety. Preferably, the zinc salts will be free of any such contamination.

Condiments which can be kept from caking, and yet act as a vehicle for delivering the nutritional amount of zinc to the animal or human, are preferably those which form a part of a daily diet. Sugar; common table salt; dietic salts, i.e., mixtures of from about 20% to about 80% sodium chloride and from about 20% to about 80% potassium chloride; and seasoned salts, for example, garlic salt, onion salt and other flavored salts containing mixtures of herbs, spices and flavorings, are especially useful in this invention. For aesthetic purposes, those condiments which are white, or which contain white particles or granules, are most preferred, since the saliva-insoluble, non-hygroscopic zinc salts are commonly white.

The condiment is in a granular form suitable for use at the table or in cooking. If the condiment is in lumps or large blocks, it is ground and sieved to a particle size of from about 100 microns to about 600 microns, preferably from about 250 microns to about 500 microns in size. Any standard method of grinding and/or sieving the condiment can be used. If the condiment is extremely hygroscopic, such as sea salt, the grinding and sieving should be carried out under dry conditions to prevent the caking of the particles of granules.

The saliva-insoluble physiologically acceptable zinc salt is used in the form of a finely divided powder. The particles of the zinc salt are from about 1 micron to about 270 microns, preferably from about 30 to about 250 microns, most preferably from about 50 to about 100 microns in size.

The weight ratio of the condiment to zinc salt used herein is dependent both upon the zinc salt and the condiment which are used. In this regard, the molecular weight of the zinc salt and the average daily intake of the condiment are the two most important factors to be considered.

For example, one gram of zinc oxide supplies about 800 mg of available zinc; 1 gram of zinc phosphate supplies about 420 mg of zinc; and 1 gram of zinc carbonate supplies about 650 mg of zinc. Since the average daily intake of sugar is usually greater than the average daily intake of salt in the normal diet, less zinc needs to be added to sugar as a nutritional supplement than to salt.

Typical ratios of condiment:zinc salt are in the range of from about 1:0.001 to about 1:0.1, preferably from 1:0.01 to 1:0.05.

For zinc oxide and table salt, with an average ingestion of 1 gram to 6 grams per day, a weight ratio in the range of from about 1 part table salt to from about 0.01 to about 0.05 zinc salt supplies the 50 milligram per day requirement of zinc.

The zinc salt and the condiment are mixed in a manner which causes the individual condiment particles to become substantially coated with a safe and effective amount of the zinc salt. The mixing can be done in a commercial mixer or blender, or simply shaking a closed container containing the two materials.

There is no need for an adhesive or other chemical or physical method to coat the condiment particles with the zinc salts. The finely powdered zinc salt particles adhere to the larger condiment particles by electrostatic attraction. Zinc oxide is available as a very fine powder. As such, it is highly preferred for use in the practice of this invention.

If the particles of the granular condiment are not substantially coated with the zinc salts, the condiment will cake or form lumps. Moreover, the homogeneous mixture of the condiment and zinc salt provided by the coating process is preferred because the uniform distribution of the zinc salt throughout the condiment assures a uniform administration of the zinc supplement.

When the condiment which is substantially coated with the zinc salt is used in the normal way, that is, to season or flavor foods, the daily requirement of dietary zinc will be met. These condiments can be used to alleviate a zinc deficiency, or to supplement a diet which is deficient in zinc. As noted above, zinc is known to be useful in the metabolism of glucose, plays an important role in many enzyme reactions, promotes wound healing, and is implicated in the treatment of hypertension. In some cases, zinc has been shown to increase taste acuity and has been used as a treatment for children suffering from pica, and acrodermatitis enteropathica. Moreover, enough zinc decreases desire for sodium chloride and therefore the present invention helps to control hypertension.

The following examples illustrate the practice, but are not intended to be limiting thereof.

EXAMPLE I

A palatable zinc supplemented table salt is prepared by mixing 3.13 grams of zinc oxide and 96.87 grams of granular, common table salt. The zinc oxide particles are less than 177 microns in diameter, and the table salt granules are greater than 250 microns in diameter. The table salt and zinc oxide are placed in a glass bottle which is stoppered and then shaken vigorously for 2 to 3 minutes to coat the individual table salt particles.

This zinc supplemented salt provides about 25 milligrams of zinc per gram of sodium chloride. When stored under conditions of 73% relative humidity and 90° F., the salt does not cake and remains free-flowing.

The table salt prepared in Example I is sprinkled on cooked eggs. No difference in taste is perceived between the eggs "salted" with the zinc supplemented salt and those flavored with ordinary table salt. No aftertaste is perceived.

When the zinc oxide of Example I is replaced with 3.85 grams zinc carbonate, similar results are obtained.

When the zinc oxide of Example I is replaced with 5.95 grams of zinc phosphate, similar results are obtained.

In contrast with the procedure of Example I, 96.87 grams of granular, common table salt and 3.13 grams of the finely-powdered zinc oxide are admixed by simply sprinkling the zinc oxide on the sodium chloride to form a heterogeneous mixture. No coating step is used. When stored at 73° F., and 50% relative humidity for one week, the sodium chloride cakes and is no longer free flowing.

EXAMPLE II

| Ingredient | Amount |
| --- | --- |
| Sucrose | 100 g. |
| Zinc phosphate | 6.5 g. |

The sucrose (commercial granulated table sugar) and zinc phosphate are placed in a mechanical mixer and mixed until the zinc phosphate substantially coats the sugar particles. When this mixture is stored under ambient conditions for about 1 week, no caking is observed.

This mixture will supply about 25 milligrams of zinc per gram of sugar.

EXAMPLE III

| Ingredient | Amount |
| --- | --- |
| Granular sea salt | 50 g. |
| Zinc oxide | 5 g. |

The zinc oxide and granular sea salt are mechanically blended until the zinc oxide substantially coats the individual particles of sea salt. When stored under humid conditions, no caking or lumping is observed.

When the zinc oxide is replaced with zinc phosphate, similar results are observed.

EXAMPLE IV

| Ingredient | Amount |
| --- | --- |
| Sodium chloride | 20 g. |
| Potassium chloride | 80 g. |
| Zinc chloride | 5.5 g. |

The sodium chloride and potassium chloride are mechanically blended with the zinc oxide until it substantially coats the individual particles of the two salts. The resulting composition is a low sodium salt particularly useful for those who are on sodium restricted diets.

When stored under humid conditions, no caking is observed.

EXAMPLE V

When the table salt prepared according to Example I is substituted for table salt in a human diet, the person consumes less salt than before the substitution is made. The appetite for salt is decreased by the consumption of zinc supplemented table salt.

What is claimed is:

1. A non-caking, palatable and nutritional composition, comprising: a granular condiment selected from the group consisting of sodium chloride, mixtures of sodium chloride and potassium chloride, and sugar, the individual particles of said condiment being substantially coated with an amount of a saliva-insoluble, physiologically acceptable zinc salt selected from the group consisting of zinc oxide, zinc carbonate, and zinc phosphate, and mixtures thereof, in the form of a finely divided powder sufficient to prevent caking of said granular condiment, to supplement dietary zinc levels and to alleviate dietary deficiencies of zinc.

2. A composition according to claim 1 in which the weight ratio of condiment to zinc salt is in the range of from about 1:0.001 to about 1:0.1.

3. A composition according to claim 2 in which the zinc salt is zinc oxide.

4. A composition according to claim 3 in which the weight ratio of condiment to zinc oxide is in the range of from about 1:0.01 to about 1:0.05.

5. A composition according to claim 1 in which the condiment is common granular table salt.

6. A composition according to claim 5 in which the weight ratio of table salt to zinc salt is in the range of from about 1:0.001 to about 1:0.1.

7. A composition according to claim 6 in which the table salt is from 100 microns to about 600 microns in size.

8. A composition according to claim 7 in which the zinc salt is zinc oxide.

9. A composition according to claim 8 in which the zinc oxide particles are from about 30 to about 250 microns in size.

10. A composition according to claim 1 in which the condiment is a dietic table salt which comprises a mixture of from about 20% to about 80% by weight sodium chloride and from about 20% to about 80% by weight potassium chloride.

11. A composition according to claim 10 in which the weight ratio of condiment to zinc salt is in the range of from about 1:0.001 to about 1:0.1.

12. A composition according to claim 11 in which the zinc salt is zinc oxide.

13. A composition according to claim 2 in which the condiment is a seasoned table salt.

14. A composition according to claim 2 in which the condiment is granular sea salt.

15. A composition according to claim 2 in which the condiment is sugar.

16. A process for preparing a non-caking, palatable and nutritional composition comprising: mixing particles of a granular condiment selected from the group consisting of sodium chloride, mixtures of sodium chloride and potassium chloride, and sugar with a saliva-insoluble, physiologically acceptable zinc salt selected from the group consisting of zinc oxide, zinc carbonate, and zinc phosphate, and mixtures thereof in the form of a finely divided powder to substantially coat said condiment particles with said zinc salt.

17. A process according to claim 16 in which said condiment particles are mechanically blended with said zinc salts.

18. A process according to claim 17 in which the weight ratio of condiment to zinc salt is in the range of from about 1:0.001 to 1:0.1.

19. A process according to claim 18 in which the zinc salt is zinc oxide.

20. A process according to claim 19 in which the weight ratio of condiment to zinc oxide is in the range of from about 1:0.01 to about 1:0.05.

21. A process according to claim 16 in which the condiment is granular, common table salt.

22. A process according to claim 21 in which the weight ratio of condiment to zinc salt is in the range of from about 1:0.001 to about 1:0.1.

23. A process according to claim 22 in which the table salt is from about 100 microns to about 600 microns in size.

24. A process according to claim 23 in which the zinc salt is zinc oxide.

25. A process according to claim 24 in which the zinc oxide particles are from about 30 to about 250 microns in size.

26. A process according to claim 16 in which the condiment is a dietetic table salt which comprises a mixture of from about 20% to about 80% by weight sodium chloride and from about 20% to about 80% by weight potassium chloride.

27. A process according to claim 26 in which the weight ratio of condiment to zinc salt is in the range of from about 1:0.001 to about 1:0.1.

28. A process according to claim 27 in which the zinc salt is zinc oxide.

29. A process according to claim 16 in which the condiment is a seasoned table salt.

30. A process according to claim 16 in which the condiment is granular sea salt.

31. A process according to claim 16 in which the condiment is sugar.

32. A process according to claim 16 wherein said condiment particles are electrostatically coated with said zinc salt.

* * * * *